April 23, 1929.  M. GUETT  1,710,576

SPRING FOR ELECTRIC SNAP SWITCHES

Filed June 4, 1926

Inventor:—
Monroe Guett,
by his Attorneys,

Patented Apr. 23, 1929.

1,710,576

UNITED STATES PATENT OFFICE.

MONROE GUETT, OF HARTFORD, CONNECTICUT, ASSIGNOR TO HART & HEGEMAN MANUFACTURING COMPANY, OF HARTFORD, CONNECTICUT, A CORPORATION OF CONNECTICUT.

SPRING FOR ELECTRIC SNAP SWITCHES.

Application filed June 4, 1926. Serial No. 113,771.

My invention relates to certain improvements in rotary electric snap-switches.

The object of my invention is to provide a spring for a snap-switch which will have considerably greater strength than the ordinary single coil spring, and which can be made very cheaply and can be mounted in a comparatively small space.

Figure 1:
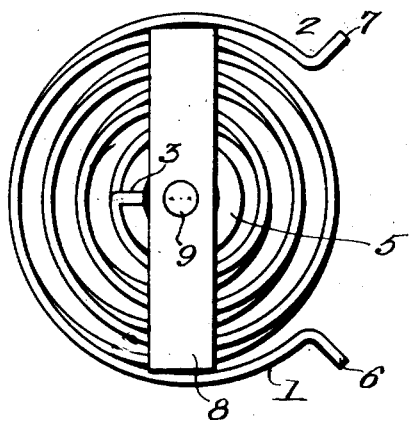
Fig. 1 is a plan view of my improved spring for electric switches.
Figure 3:
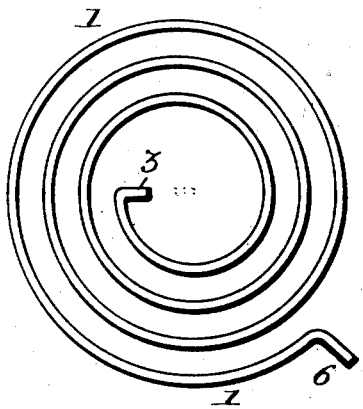
Fig. 3 is a detailed view, showing one of the spring sections.
Figure 2:
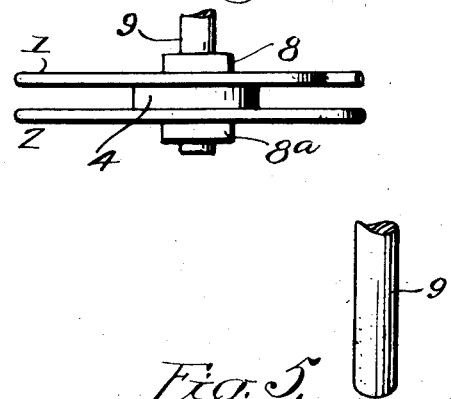
Fig. 2 is a side view.
Figure 4:
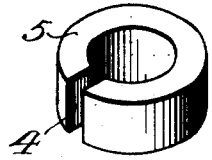
Fig. 4 is a detailed perspective view of the connecting hub.
Figure 5:
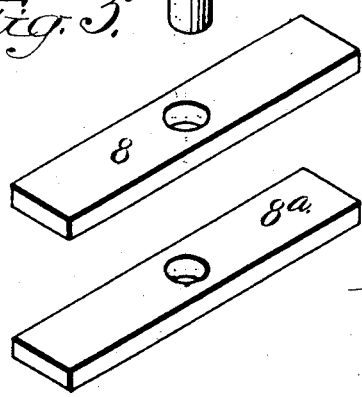
Fig. 5 is a detailed view showing the retaining plates and screw.

The spring is made in two sections 1 and 2. The sections are identical in form and each section is bent at its inner end at 3 to enter a slot 4 in a floating connecting hub 5. The outer end of the spring section 1 is bent as at 6 to engage one of the parts of the snap-switch structure, and the other section 2 is bent as at 7 to engage other parts of the snap-switch structure. This switch structure is not shown, as it may be of any standard type.

In order to hold the two spring sections together, plates 8—8ª of any suitable shape are provided, which extend above and below the springs as shown in Fig. 1 and rest upon the hub 4.

When the spring is applied to a switch structure, the spindle 9 of the switch extends through an opening in the plate 8 and into an opening in the plate 8ª. The plates are fastened to the spindle in any suitable manner and the springs are thus held in parallel position. The hub is free to rotate with the springs and also with relation to the plates.

Thus, by making a spring member of two comparatively short sections connected by a hub, I have been enabled to materially increase the elasticity of the spring and also its efficiency.

One end of the spring, when operated, engages a part of one of the plates, and the outer end of the other spring engages a part of the switching member which it is to throw.

I claim:

1. The combination in a spring structure, of two spiral spring sections, one section being a continuation of the other section; and a connecting floating hub free to turn with the spring sections.

2. The combination in a spring structure, of two spiral spring sections, one section being a continuation of the other section; a floating hub connecting the two sections and free to turn with the sections of the springs; and plates for holding the parts in alignment.

3. The combination in a switch structure, of two spiral spring sections, one section being a continuation of the other section, the inner coil of each section having a projection; and a floating connecting hub located at the centre of the spring sections and having a slot into which the projections on the inner ends of the springs extend, the outer end of each spring section having a projection to be engaged by the elements of the device to which it is applied.

4. The combination in a switch structure, of a floating hub having a slot therein; two coiled spring sections, one section being a continuation of the other section, the inner coil of each section having a projection entering the slot in the hub, the outer end of each projection arranged to be engaged by an element of the device to which it is applied; two plates mounted on either end of the hub and retaining the springs in engagement with the hub; and a spindle extending through the hub and attached to the plates, the hub being free to turn on the spindle with the spring sections.

MONROE GUETT.